US011832165B2

(12) United States Patent
Elshafie et al.

(10) Patent No.: US 11,832,165 B2
(45) Date of Patent: Nov. 28, 2023

(54) STATE-BASED SENSING PROCEDURE

(71) Applicant: QUALCOMM Incorporated, San Diego, CA (US)

(72) Inventors: Ahmed Elshafie, San Diego, CA (US); Ahmed Attia Abotabl, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 17/247,039

(22) Filed: Nov. 24, 2020

(65) Prior Publication Data

US 2022/0167252 A1 May 26, 2022

(51) Int. Cl.
*H04W 48/16* (2009.01)
*H04B 17/327* (2015.01)
*H04B 17/382* (2015.01)
*H04W 48/20* (2009.01)
*H04L 5/00* (2006.01)
*H04L 27/00* (2006.01)
*H04W 72/0453* (2023.01)
*H04W 72/044* (2023.01)

(52) U.S. Cl.
CPC .......... *H04W 48/16* (2013.01); *H04B 17/327* (2015.01); *H04B 17/382* (2015.01); *H04W 48/20* (2013.01); *H04W 72/0453* (2013.01); *H04W 72/0473* (2013.01)

(58) Field of Classification Search
CPC ... H04W 48/16; H04W 48/20; H04W 72/044; H04W 72/0453; H04W 72/0473; H04B 17/309; H04B 17/318; H04B 17/327; H04B 17/382
See application file for complete search history.

(56) References Cited

U.S. PATENT DOCUMENTS

| 10,757,736 | B2 * | 8/2020 | Kim | H04W 16/14 |
| 2004/0170186 | A1 * | 9/2004 | Shao | H04L 47/801 370/413 |
| 2008/0310324 | A1 * | 12/2008 | Chaponniere | H04W 28/12 370/254 |
| 2009/0254874 | A1 * | 10/2009 | Bose | G06F 30/39 716/113 |

(Continued)

FOREIGN PATENT DOCUMENTS

| CN | 111294942 A | 6/2020 |
| WO | WO-2020033088 A1 | 2/2020 |
| WO | WO-2020126657 A1 | 6/2020 |

OTHER PUBLICATIONS

International Search Report and Written Opinion—PCT/US2021/071603—ISA/EPO—dated Jan. 17, 2022.

(Continued)

*Primary Examiner* — Jenee Holland
(74) *Attorney, Agent, or Firm* — Harrity & Harrity, LLP

(57) ABSTRACT

Various aspects of the present disclosure generally relate to wireless communication. In some aspects, a user equipment (UE) may determine a state associated with a sensing procedure, for sensing availability of a resource, based at least in part on one or more state parameters. The UE may perform the sensing procedure to sense availability of the resource based at least in part on determining the state. Numerous other aspects are provided.

28 Claims, 9 Drawing Sheets

(56) References Cited

U.S. PATENT DOCUMENTS

| | | | | |
|---|---|---|---|---|
| 2010/0014500 | A1* | 1/2010 | Lee | H04L 12/18 370/342 |
| 2010/0177730 | A1* | 7/2010 | Okuda | H04W 72/085 370/329 |
| 2011/0134871 | A1* | 6/2011 | Nogami | H04L 27/2636 370/329 |
| 2011/0235570 | A1* | 9/2011 | Seo | H04W 40/08 370/315 |
| 2011/0267955 | A1* | 11/2011 | Dalsgaard | H04W 24/00 370/241 |
| 2012/0134275 | A1* | 5/2012 | Choi | H04L 5/0057 370/241 |
| 2012/0174231 | A1* | 7/2012 | Avritzer | G06F 11/00 726/25 |
| 2013/0258893 | A1* | 10/2013 | Baker | H04L 1/003 370/252 |
| 2013/0346345 | A1* | 12/2013 | Osogami | G06Q 30/0283 705/412 |
| 2014/0160946 | A1* | 6/2014 | Bodas | H04W 52/242 370/252 |
| 2014/0219375 | A1* | 8/2014 | Zhu | H04B 7/0626 375/267 |
| 2015/0016428 | A1* | 1/2015 | Narasimha | H04W 24/02 370/336 |
| 2015/0149393 | A1* | 5/2015 | Hwang | G06N 20/00 706/12 |
| 2016/0050651 | A1* | 2/2016 | Yuan | H04L 5/0044 455/450 |
| 2017/0041912 | A1* | 2/2017 | Tanaka | H04W 16/14 |
| 2017/0171855 | A1* | 6/2017 | Sundararajan | H04W 72/0413 |
| 2017/0318468 | A1* | 11/2017 | Aijaz | H04W 72/0433 |
| 2018/0332585 | A1* | 11/2018 | Faurie | H04W 76/14 |
| 2019/0045345 | A1* | 2/2019 | Lee | H04L 5/0048 |
| 2019/0124574 | A1* | 4/2019 | Yang | H04W 36/36 |
| 2019/0174571 | A1* | 6/2019 | Deenoo | H04W 76/11 |
| 2019/0313279 | A1* | 10/2019 | Li | H04W 72/12 |
| 2019/0387377 | A1* | 12/2019 | Zhang | H04W 84/005 |
| 2020/0029340 | A1* | 1/2020 | He | H04W 72/10 |
| 2020/0100284 | A1* | 3/2020 | Li | H04W 74/0808 |
| 2020/0100286 | A1* | 3/2020 | Xu | H04W 72/0446 |
| 2020/0127901 | A1* | 4/2020 | Hariharan | H04B 17/336 |
| 2020/0128441 | A1* | 4/2020 | Singh | H04L 41/22 |
| 2020/0163005 | A1* | 5/2020 | Rao | H04W 4/46 |
| 2020/0196279 | A1* | 6/2020 | Thomas | H04W 4/40 |
| 2020/0281010 | A1* | 9/2020 | Jiang | H04W 72/1268 |
| 2020/0296762 | A1* | 9/2020 | Sun | H04W 72/046 |
| 2022/0015110 | A1* | 1/2022 | Liang | H04L 5/0094 |

OTHER PUBLICATIONS

Spreadtrum Communications: "Discussion on NR Sidelink Mode 2 Resource Allocation", 3GPP Draft, 3GPP TSG RAN WG1 #98bis, R1-1910007, Discussion on NR Sidelink Mode 2 Resource Allocation_Final, 3rd Generation Partnership Project (3GPP), Mobile Competence Centre, 650, Route Des Lucioles, F-06921 Sophia-Antipo, vol. RAN WG1, No. Chongqing, China, Oct. 14, 2019-Oct. 20, 2019, Oct. 1, 2019 (Oct. 1, 2019), XP051807997, 5 Pages, Retrieved from the Internet: URL: https://ftp.3gpp.org/tsg_ran/WG1_RL1/TSGR1_98b/Docs/R1-1910007.zip. R1-1910007, Discussion on NR Sidelink Mode 2 Resource Allocation_final.docx. [Retrieved on Oct. 30, 2019] "2 Conclusions".

* cited by examiner

STATE-BASED SENSING PROCEDURE

FIELD OF THE DISCLOSURE

Aspects of the present disclosure generally relate to wireless communication and to techniques and apparatuses for performing a state-based sensing procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication at a user equipment (UE) includes a memory; and one or more processors coupled to the memory, the memory and the one or more processors configured to: determine a state associated with a sensing procedure, for sensing availability of a resource, based at least in part on one or more state parameters; and perform the sensing procedure to sense availability of the resource based at least in part on determining the state.

In some aspects, a method of wireless communication performed by a UE includes determining a state associated with a sensing procedure, for sensing availability of a resource, based at least in part on one or more state parameters; and performing the sensing procedure to sense availability of the resource based at least in part on determining the state.

In some aspects, a non-transitory computer-readable medium storing a set of instructions for wireless communication includes one or more instructions that, when executed by one or more processors of a UE, cause the UE to: determine a state associated with a sensing procedure, for sensing availability of a resource, based at least in part on one or more state parameters; and perform the sensing procedure to sense availability of the resource based at least in part on determining the state.

In some aspects, an apparatus for wireless communication includes means for determining a state associated with a sensing procedure, for sensing availability of a resource, based at least in part on one or more state parameters; and means for performing the sensing procedure to sense availability of the resource based at least in part on determining the state.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
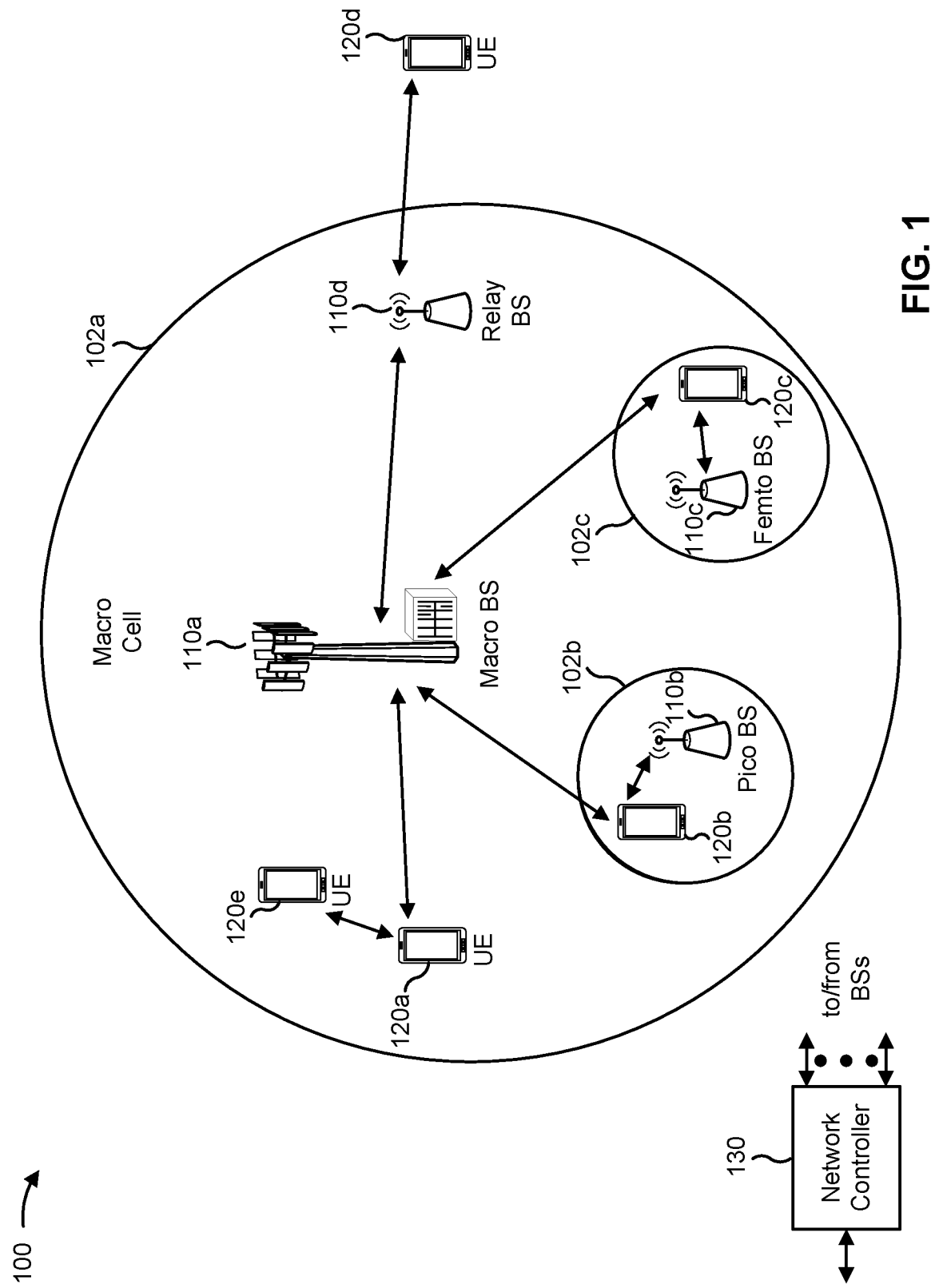
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
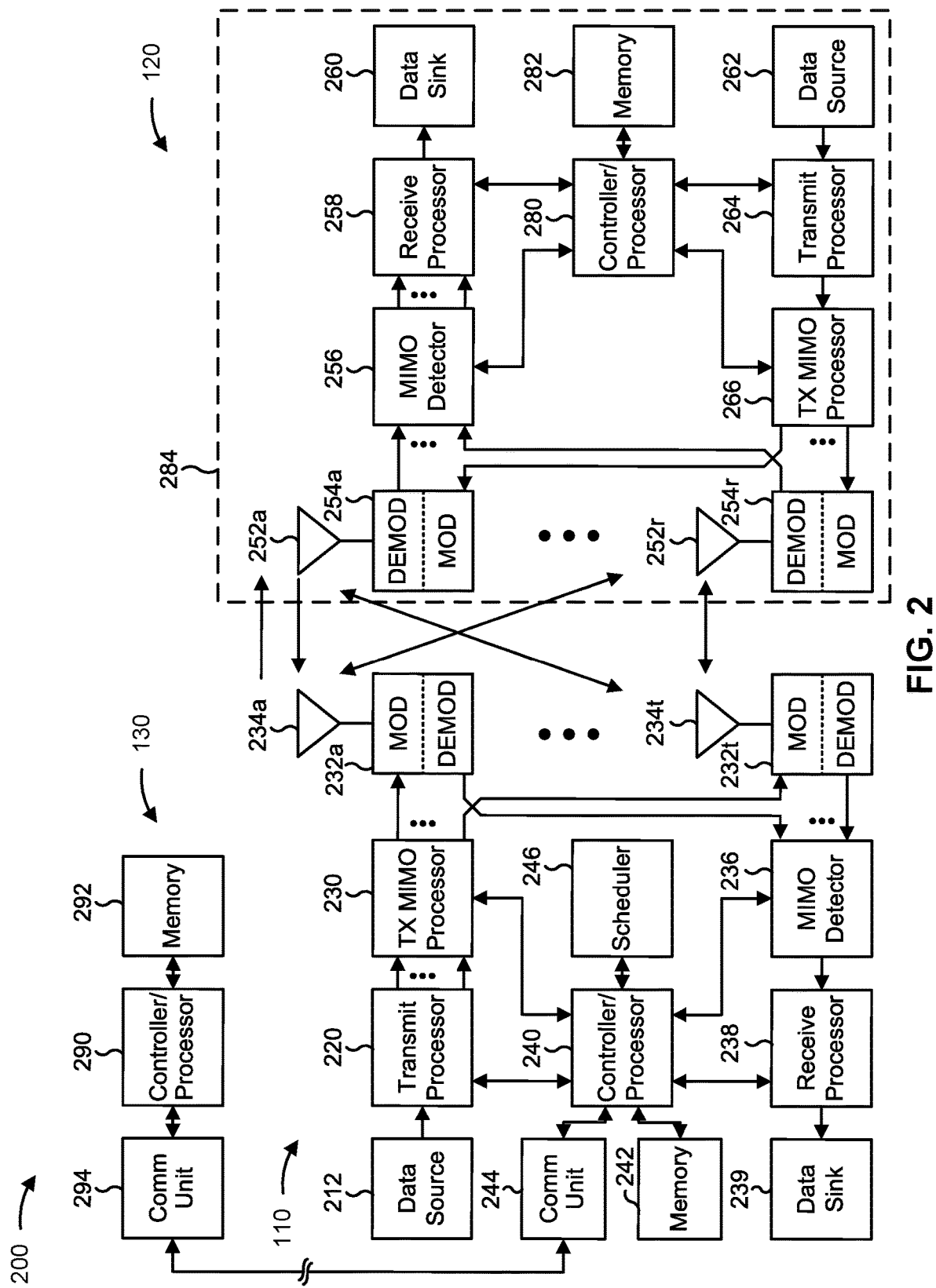
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-9.

Controller/processor 240 of base station 110, controller/processor 280 of UE 120, and/or any other component(s) of FIG. 2 may perform one or more techniques associated with performing a state-based sensing procedure, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, and/or interpreting the instructions, among other examples.

In some aspects, the UE (e.g., UE 120) includes means for determining a state associated with a sensing procedure, for sensing availability of a resource, based at least in part on one or more state parameters; and means for performing the sensing procedure to sense availability of the resource based at least in part on determining the state. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining, based at least in part on selecting a sensing window size, a number of slots, and an RSRP threshold, an optimized sensing window size, an optimized number of slots, and an optimized RSRP threshold to be utilized for performing the sensing procedure for the state.

In some aspects, the UE includes means for quantizing one or more values associated with the one or more state parameters to provide one or more quantized values; and means for transmitting the one or more quantized values to another UE.

In some aspects, the UE includes means for receiving one or more quantized values associated with the one or more state parameters from another UE, wherein the means for performing the sensing procedure includes means for selecting and/or updating selection of a sensing window size, a number of slots, and a RSRP threshold based at least part on the one or more quantized values.

In some aspects, the UE includes means for determining, for the state, respective probabilities for selecting a sensing window size, a number of slots, and a RSRP threshold, wherein the means for performing the sensing procedure includes means for selecting the sensing window size, the number of slots, and the RSRP threshold based at least in part on the respective probabilities.

In some aspects, the UE includes means for determining respective probabilities including determining random values associated with the respective probabilities, and means for performing the sensing procedure includes means for updating the random values based at least in part on received feedback.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A sidelink network may include a base station and a plurality of UEs. The base station may communicate with one or more of the plurality of UEs via respective access links. The plurality of UEs may operate in sidelink modes to communicate (e.g., transmit and/or receive data) with one another via one or more sidelink channels.

In a sidelink mode (e.g., Mode-1 Resource Allocation Mode), the base station may configure and control utilization of sidelink resources (e.g., subchannels) accessible for sidelink communication. For instance, the base station may configure a predetermined number of sidelink resources and may control selection by a transmitting UE of one or more of the configured sidelink resources to transmit data to one or more of the other UEs in the sidelink network (e.g., receiving UEs).

In another sidelink mode (e.g., Mode-2 Resource Allocation Mode), the base station may configure the predetermined number of sidelink resources accessible for sidelink communication. The plurality of UEs, and not the base station, may control utilization of the configured sidelink resources by performing scheduling of communications in the sidelink network. For instance, without involvement of the base station, the transmitting UE may autonomously select one or more of the configured sidelink resources by scheduling transmissions thereon to transmit data to the one or more receiving UEs.

Figure 3:
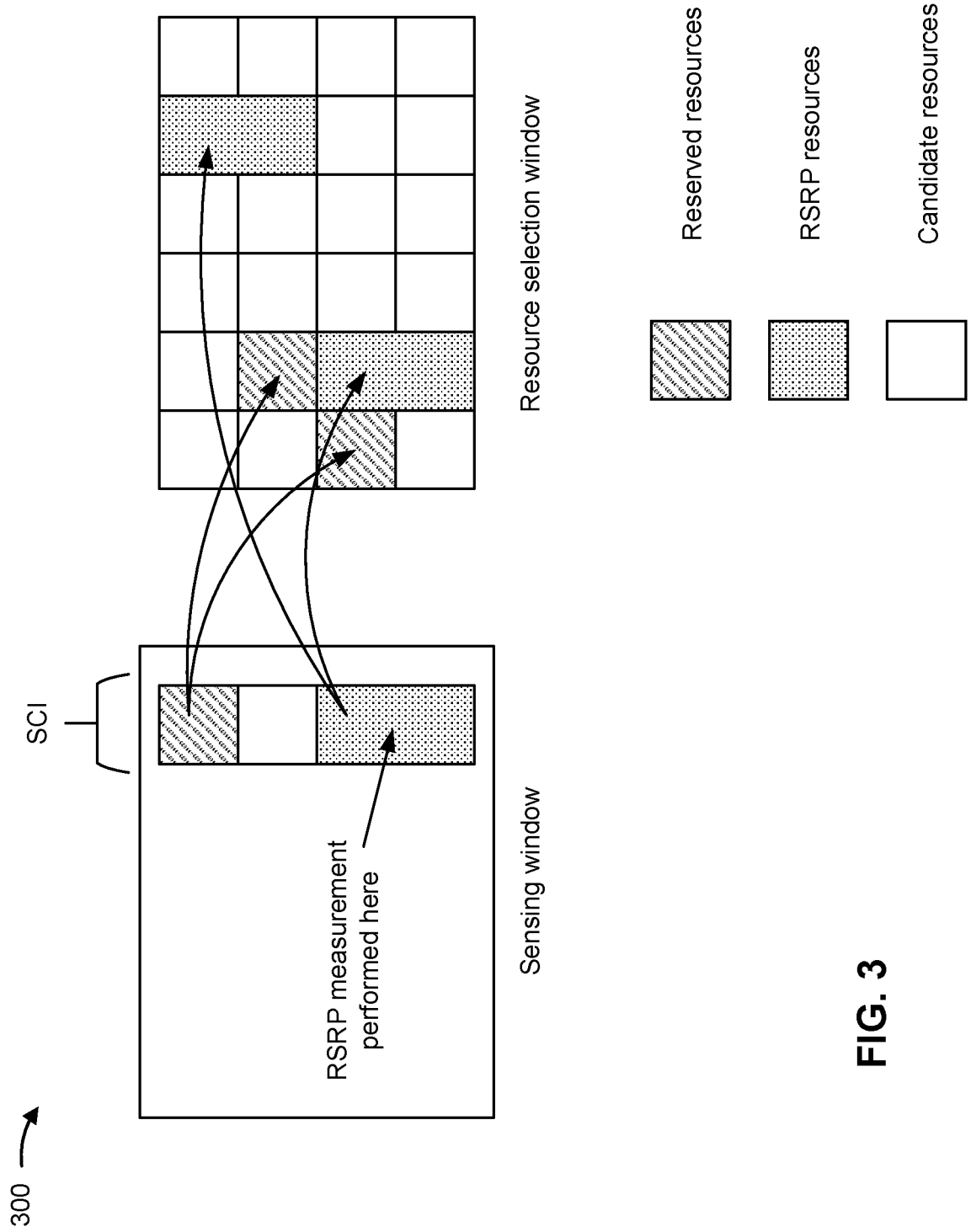
FIG. 3 is a diagram illustrating an example associated with a state-based sensing procedure, in accordance with various aspects of the present disclosure.

The transmitting UE may autonomously select one or more of the configured sidelink resources by performing a sensing procedure. FIG. 3 is a diagram illustrating an example 300 associated with performing the sensing procedure, in accordance with various aspects of the present disclosure. As shown in FIG. 3, the transmitting UE may utilize a sensing window that includes sidelink control information (SCI) received in a communication from another UE in the sidelink network. The SCI may indicate reservation of one or more of the configured sidelink resources for utilization by the other UE. The transmitting UE may decode the SCI to determine the one or more of the configured sidelink resources that are reserved for utilization by the other UE (e.g., reserved resources). Such reserved resources may be projected on a resource selection window that shows resources that are possibly available for utilization by the transmitting UE. The reserved resources may be excluded from the possibly available resources and may not be utilized by the transmitting UE.

The transmitting UE may also perform RSRP measurements with respect to the reserved resources and may determine RSRP resources (shown in FIG. 3) for which the RSRP measurements satisfy a threshold RSRP level (e.g., RSRP measurement is equal to or greater than the threshold RSRP level). Such RSRP resources may be impacted by utilization of the reserved resources by the other UE and may not be utilized by the transmitting UE.

The transmitting UE may utilize resources for which the RSRP measurements fail to satisfy the threshold RSRP level (e.g., RSRP measurement is lower than the threshold RSRP level). Additionally, the transmitting UE may utilize one or more of a remainder of the resources within the resource selection window. The resources that the transmitting UE may utilize may be collectively referred to as candidate resources.

Performing the sensing procedure may enable the transmitting UE to avoid a situation in which the transmitting UE transmits the sidelink communication utilizing a reserved resource or an RSRP resource (e.g., a contention). On the other hand, performing the sensing procedure may involve the transmitting UE consuming a threshold amount of power to, for example, search and decode SCIs and to perform RSRP measurements. The threshold amount of power may be consumed even when a sidelink resource is a reserved resource or an RSRP resource, which resources may not be utilized by the transmitting UE. In some instances, the transmitting UE may fail to decode the SCI resulting in failure of the transmitting UE to determine availability of the sidelink resource. In some instances, the transmitting UE may mis-detect the SCI due to, for example, lower than a threshold amount of reception energy level being associated with receiving the SCI at the transmitting UE. As a result, the transmitting UE may fail to adequately decode the SCI. For UEs, such as MTC UEs and/or NB-IoT UEs, that are designed for efficient power consumption, and can benefit from techniques that curtail power consumption, utilizing the threshold amount of power to search and decode SCIs and to perform RSRP measurements for every sidelink resource may be impracticable. This may be because, for example, these UEs may be provided with single-charge battery solutions and a limited amount of power may be available, or because these UEs may be used for long deployments in which a UE's battery is expected to last for months or years.

Various aspects of techniques and apparatuses described herein may provide a state-based sensing procedure. In some aspects, the techniques and apparatuses described herein may enable a transmitting UE to determine a state, associated with a performing a sensing procedure, as a function of one or more state parameters. Determining the state may enable the transmitting UE to determine an optimized sensing window, an optimized number of slots to sense, and an optimized RSRP threshold to utilize while performing the sensing procedure. This may enable the transmitting UE to accurately and reliably sense availability of one or more sidelink resources for utilization by the transmitting UE to transmit a sidelink communication. The accurate and reliable sensing may enable the transmitting UE to avoid a contention in a sidelink network. As a result, the transmitting UE may avoid retransmitting the sidelink communication, thereby enabling efficient utilization of network resources (e.g., bandwidth, subchannels, or the like) and internal UE resources (e.g., processing resources, use of memory space, or the like). Additionally, the transmitting UE may avoid consuming a threshold amount of power while performing the state-based sensing procedure, thereby curtailing power consumption. In this way, operation of UEs may be optimized and data communication in the sidelink network may be improved.

Figure 4:
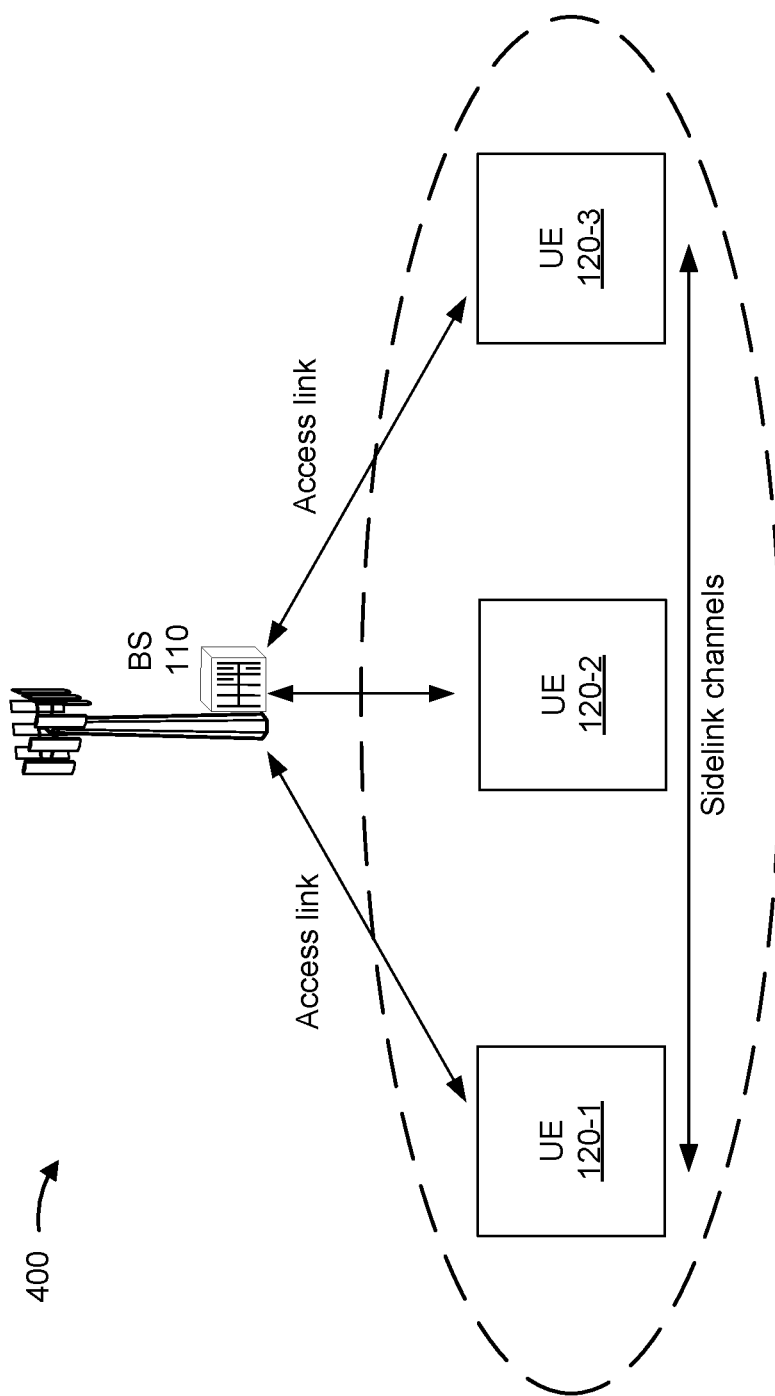
FIG. 4 is a diagram illustrating an example associated with a state-based sensing procedure, in accordance with various aspects of the present disclosure.

FIG. 4 is a diagram illustrating an example 400 associated with performing a state-based sensing procedure, in accordance with various aspects of the present disclosure. A sidelink network may include a BS 110 and a plurality of UEs (shown as UE 120-1, UE 120-2, and UE 120-3). The BS 110 may include, for example, a relay device. The relay device may include a network node such as, for example, a relay BS, a relay UE, and/or an integrated access and backhaul (IAB) node. Access link communications may be transmitted and received via the access links. For instance, the BS 110 may communicate with the UE 120-1 via a first access link, communicate with the UE 120-2 via a second access link, and/or communicate with the UE 120-3 via a third access link. In some aspects, the BS 110 may not have an access link with one or more UEs 120. In such a case, the BS 110 may communicate with such a UE 120 via a relay UE. In some aspects, an access link between the BS 110 and a UE (e.g., the UE 120-1, the UE 120-2, or the UE 120-3) may be implemented utilizing, for example, a Uu interface.

Sidelink communication may be transmitted and received via the sidelink channels. As shown in FIG. 4, the UE 120-1, the UE 120-2, and the UE 120-3 (collectively referred to as UEs 120) may conduct the sidelink communication by communicating (e.g., transmitting and/or receiving data) with one another via one or more sidelink channels. In some aspects, the one or more sidelink channels among the UEs 120 may be implemented utilizing, for example, a PC5 interface. In the sidelink network, a transmitting UE may communicate with one or more of the other plurality of UEs (e.g., receiving UEs). The UEs 120 may include one or more UEs described elsewhere herein, such as UE 120 discussed with respect to FIG. 2.

As indicated above, FIG. 4 is provided as an example. Other examples may differ from what is described with respect to FIG. 4.

Figure 5:
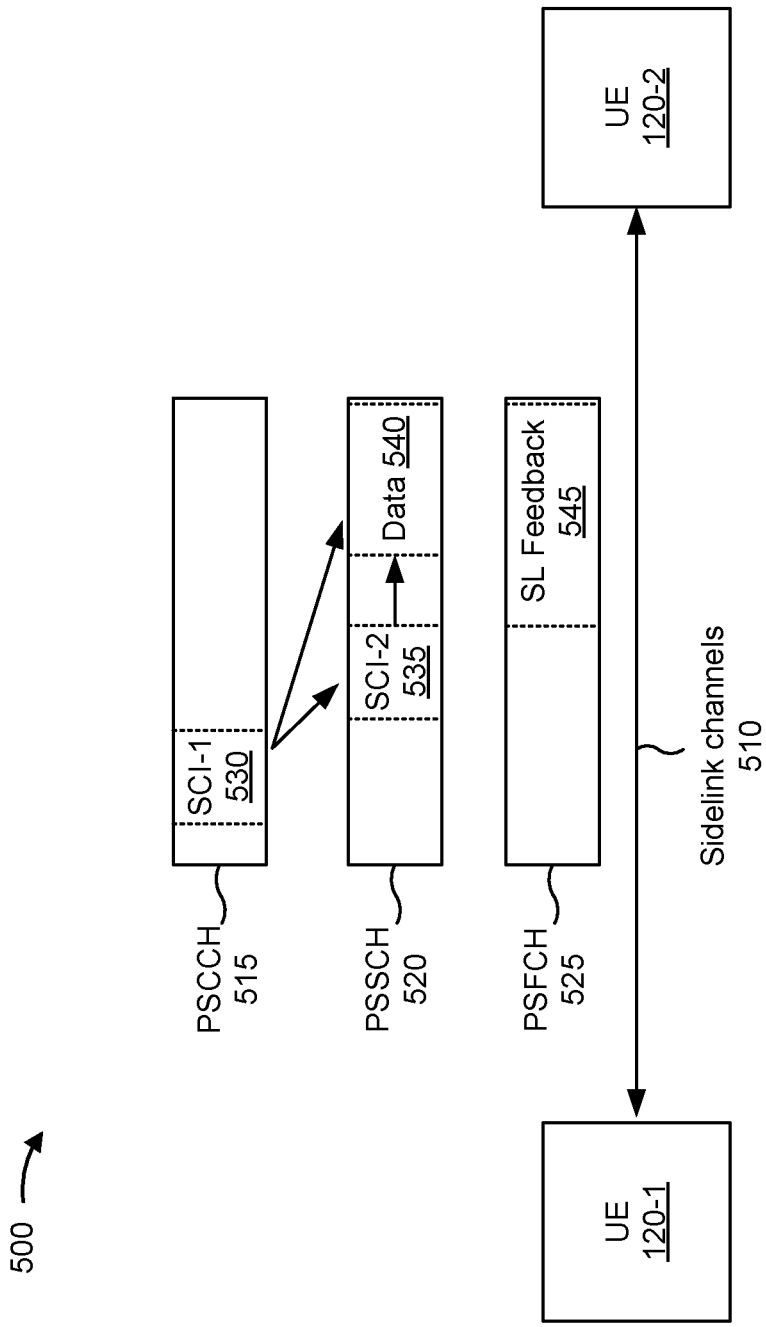
FIG. 5 is a diagram illustrating an example associated with a state-based sensing procedure, in accordance with various aspects of the present disclosure.

FIG. 5 is a diagram illustrating an example 500 associated with performing a state-based sensing procedure, in accordance with various aspects of the present disclosure. A sidelink communication network may include a plurality of UEs including, for example, UE 120-1 and UE 120-2 communicating with each other (and one or more other UEs associated with the sidelink communication network) using one or more sidelink channels 510. The plurality of UEs included in the sidelink communication network may include a plurality of UEs within a given geographical area (e.g., a given radius around a given UE). In some aspects, the plurality of UEs within the given geographical area may provide a UE density associated with the sidelink communication network. The UE density may identify a number of UEs within a threshold distance of the given UE. In some aspects, the UE 120-1 and the UE 120-2 (collectively referred to as UEs 120) may include one or more UEs described elsewhere herein, such as UE 120 discussed with respect to FIG. 2 and/or the UEs 120 discussed with respect to FIG. 4.

As shown in FIG. 5, the UE 120-1 may communicate with the UE 120-2 (and one or more other UEs) via sidelink channels 510. Communications utilizing the one or more sidelink channels 510 may include, for example, P2P communications, D2D communications, V2X communications (e.g., V2V communications, V2I communications, and/or vehicle-to-person (V2P) communications), and/or mesh networking communications. In some aspects, the sidelink channels 510 may use a PC5 interface and/or may operate in, for example, a high frequency band (e.g., the 5.9 GHz band) and/or an unlicensed or shared frequency band (e.g., an NR unlicensed (NR-U) frequency band). Additionally, or alternatively, the UEs 120 may synchronize a timing of transmission time intervals (TTIs) (e.g., frames, subframes, slots, and/or symbols) using global navigation satellite system (GNSS) timing.

As further shown in FIG. 5, the sidelink channels 510 may include a physical sidelink control channel (PSCCH) 515, a physical sidelink shared channel (PSSCH) 520, and/or a physical sidelink feedback channel (PSFCH) 525. The PSCCH 515 may be used to communicate control information, similar to a physical downlink control channel (PDCCH) and/or a physical uplink control channel (PUCCH) used for cellular communications with, for example, BS 110 via an access link or an access channel. The PSSCH 520 may be used to communicate data, similar to a physical downlink shared channel (PDSCH) and/or a physical uplink shared channel (PUSCH) used for cellular communications with, for example, BS 110 via an access link or an access channel.

The sidelink channels 510 may carry sidelink control information (SCI) to indicate various control information used for sidelink communications. The sidelink control information may include, for example, sidelink control information part 1 (SCI-1) 530 and sidelink control information part 2 (SCI-2) 535. The SCI-1 530 may be included in the PSCCH 515 and the SCI-2 535 may be included in the PSSCH 520. The SCI-1 530 may include a scheduling assignment regarding one or more resources of the sidelink channels 510 (e.g., time resources, frequency resources, and/or spatial resources). In some aspects, the scheduling assignment may include information identifying a sidelink resource reserved for utilization by one or more UEs in the sidelink network. The SCI-1 530 may also include information to enable a UE in the sidelink network to perform RSRP measurements with respect to a reserved resource. The SCI-2 535 may include various types of information, such as, for example, a hybrid automatic repeat request (HARM) process ID, a new data indicator (NDI) associated with the data 540, a unique identifier associated with a transmitting UE (a unique TX ID), a unique identifier associated with a receiving UE (a unique RX ID), and/or a channel state information (CSI) report trigger.

The PSSCH 520 may also include data 540 and information such as, for example, information for decoding sidelink communications on the PSSCH 520, a quality of service (QoS) priority value, a resource reservation period, a PSSCH demodulation reference signal (DMRS) pattern, an SCI format and/or a beta offset for sidelink control information part 2 (SCI-2) 535 transmitted on the PSSCH 520, a quantity of PSSCH DMRS ports, a modulation coding scheme (MCS), a priority associated with the reserved resource, a policy parameter used by another the UE to choose another resource selection scheme, and/or a traffic condition associated with the sidelink network.

In some aspects, the UE 120-1 may transmit both the SCI-1 530 and the SCI-2 535. In some aspects, the UE 120-1 may transmit only SCI-1 530, in which case one or more types of the information that would otherwise be transmitted in the SCI-2 535 may be transmitted in the SCI-1 530. The PSFCH 525 may be used to communicate sidelink (SL) feedback 545, such as, for example, HARQ feedback (e.g., acknowledgement or negative acknowledgement (ACK/NACK) information), transmit power control (TPC), and/or a scheduling request (SR).

In some aspects, the one or more sidelink channels 510 may use resource pools shared by the plurality of UEs. A resource pool may include a plurality of frequency resources (e.g., subchannels) to be utilized by one or more UEs for transmitting and/or receiving sidelink communications. In some aspects, a scheduling assignment (e.g., included in SCI-1 530) may be transmitted in subchannels, arranged in one or more slots, including specific resource blocks (RBs) across time. In some aspects, data 540 (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions may be transmitted using non-adjacent RBs.

In some aspects, a transmitting UE (e.g., the UE 120-1) may perform the state-based sensing procedure to accurately and reliably sense availability of a sidelink resource. In some aspects, the transmitting UE may determine a state associated with the state-based sensing procedure based at least in part on one or more state parameters. The one or more state parameters may include parameters associated with resource utilization conditions and or parameters associated with transmission properties related to transmitting a sidelink communication.

Parameters associated with resource utilization conditions may include, for example, a channel busy ratio (CBR) and/or a channel occupancy ratio (CR). The CBR may indicate, for example, a relationship of a number of resources being utilized by one or more transmitting UEs in the sidelink network with respect to a total number of resources available in the sidelink network. In some aspects, the CBR may identify a number of reserve resources that are unavailable for utilization by the transmitting UE. The CR that may indicate, for example, a relationship of a number of resources utilized by a given UE in the sidelink network with respect to the total number of resources available in the sidelink network. In some aspects, the CR may be based at least in part on past resource utilizations of the given UE and/or expected resource utilizations of the given UE in the future.

Parameters associated with transmission properties related to transmitting a sidelink communication may include, for example, one or more of a modulation and coding scheme (MCS), a transport block size (TB size), a frequency allocation size, a frequency of transmission, or a priority associated with a transmission. In some aspects, the MCS may indicate a number of useful bits of the sidelink communication that can be transmitted per transport block and may be based at least in part on a measure of quality associated with a sidelink channel to be utilized to transmit the sidelink communication. The MCS may indicate, for example, a code rate and a modulation scheme to be used for transmitting the sidelink communication. The TB size may indicate, for example, an amount of payload data of the sidelink communication that may be transmitted via a transport block. The frequency allocation size may indicate, for example, an amount of frequency resources (e.g., subchannels) allocated to the sidelink network. In some aspects, the frequency allocation size may indicate, for example, an amount of frequency resources (e.g., subchannels) allocated for transmission of the sidelink communication by the transmitting UE. The frequency of transmission may indicate, for example, a frequency of transmission of sidelink communications by one or more UEs (e.g., transmitting UE) in the sidelink network. The priority associated with a transmission may indicate, for example, a quality of service assigned to a transmission of the sidelink communication by the transmitting UE. In some aspects, the transmitting UE may transmit information associated with the assigned quality of service in sidelink control information (e.g., SCI-1 and/or SCI-2).

In some aspects, the transmitting UE may determine quantized values of one or more of the state parameters. For instance, the transmitting UE may determine a quantized value for the CBR (e.g., quantized CBR value (K1)) and may represent the quantized CBR value as $K1=2^{k1}$ levels for CBR, where k1 represents a first given number of bits associated with transmitting the sidelink communication. Similarly, the transmitting UE may determine a quantized value for the CR (e.g., quantized CR value (K2)) and may represent the quantized CR value as $K2=2^{k2}$ levels of CR, where k2 represents a second given number of bits associated with transmitting the sidelink communication. In some aspects, the transmitting UE may determine a quantized value for the MCS. For instance, the transmitting UE may determine a respective quantized value for each of a number of potential MCS levels that may be used to transmit the sidelink communication.

In some aspects, the transmitting UE may determine a quantized value for the TB size. For instance, the transmitting UE may determine a respective quantized value for each of a number of potential TB sizes that may be used to transmit the sidelink communication. In some aspects, the transmitting UE may determine a quantized value for the frequency allocation. For instance, the transmitting UE may determine a respective quantized value for each of a number of potential frequency resources (e.g., subchannels) allocated for transmission of the sidelink communication. In some aspects, the transmitting UE may determine a quantized value for the frequency of transmission. For instance, the transmitting UE may determine one or more levels associated with the number of transmissions of the one or more sidelink communications by the transmitting UE, and the transmitting UE may assign a respective quantized value to each of the determined one or more levels. In some aspects, the transmitting UE may determine a quantized value for the priority associated with a transmission. For instance, the transmitting UE may determine a respective quantized value for each of a number of priority levels that may be associated with transmission of the sidelink communication. Additionally, or alternatively, each priority level may be represented by a respective quantized value (e.g., 0, 1, 2, 3, and so on), and the transmitting UE may determine the priority levels in accordance with the quantized values.

In some aspects, to sense availability of a sidelink resource (or a group of sidelink resources), the transmitting UE may determine, at a given time associated with transmitting the sidelink communication, the state as a function of the quantized values of the one or more state parameters. In some aspects, the state (S) may be represented as S=f (quantized CBR value (K1), quantized CR value (K2), quantized MCS levels, quantized TB sizes, quantized frequency allocation, quantized frequency of transmission, and/or quantized priority levels).

Based at least in part on determining the state (S), the transmitting UE may select a sensing window size, a number of slots, and an RSRP threshold for performing the state-based sensing procedure to sense availability of the resource (or the group of resources). In some aspects, there may be J number of sensing window sizes (W_1, W_2, W_3, . . . , W_J) and based at least part on determining the state (S), the transmitting UE may select a given sensing window size for performing the state-based sensing procedure.

Figure 6:
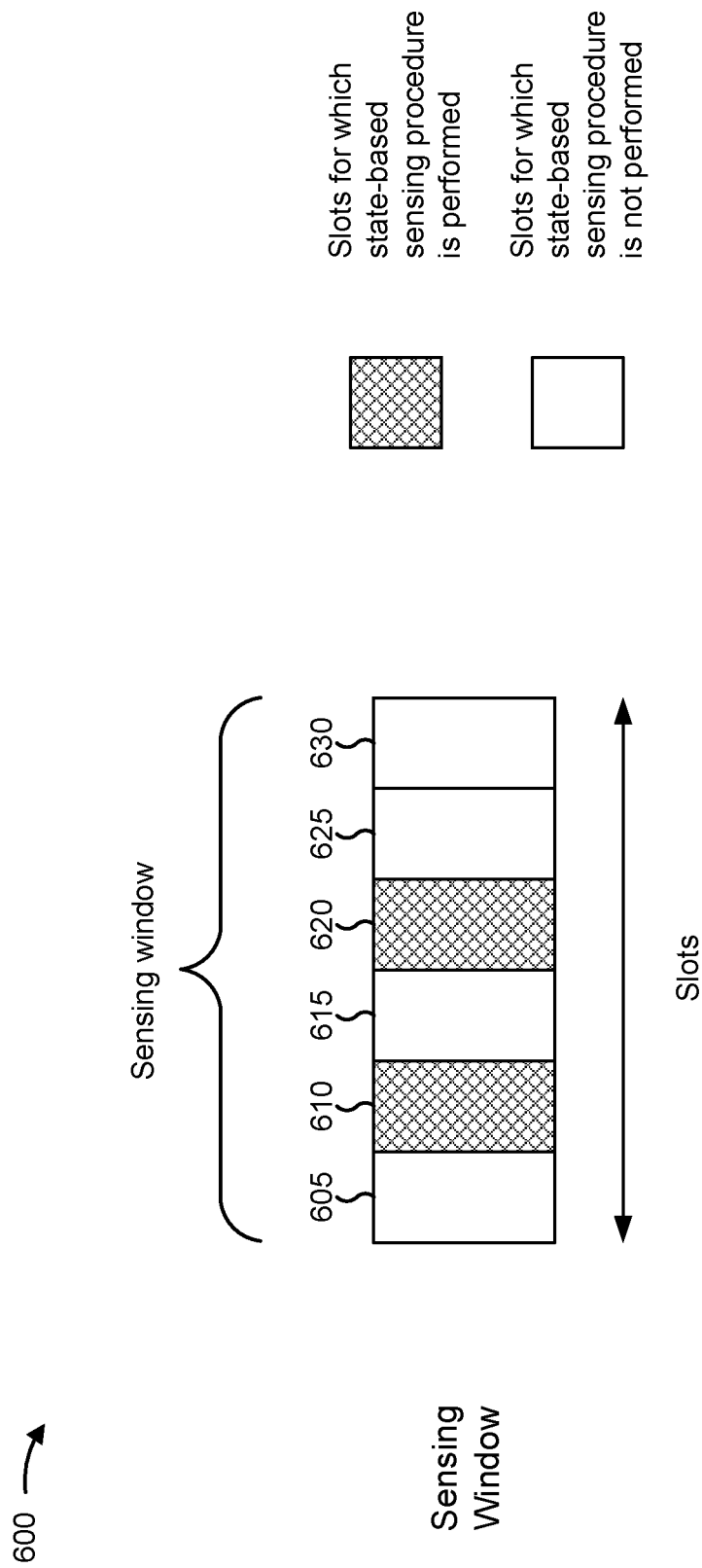
FIG. 6 is a diagram illustrating an example associated with a state-based sensing procedure, in accordance with various aspects of the present disclosure.

In some aspects, as shown in FIG. 6, a sensing window may be divided into a plurality of (time) slots (e.g., slot 605, slot 610, slot 615, slot 620, slot 625, slot 630), one or more of which may be respectively associated with one or more sidelink resources accessible in the sidelink network. The transmitting UE may sense availability of one or more sidelink resources by selecting, based at least in part on determining the state (S), one or more slots for performing the state-based sensing procedure. For instance, as shown in FIG. 6, the transmitting UE may select, for example, slot 610 to sense availability of one or more sidelink resources associated with slot 610. Similarly, the transmitting UE may select, for example, slot 620 to sense availability of one or more sidelink resources associated with slot 620. In an example, as shown in FIG. 6, slots 610, 620 are slots for which the transmitting UE decides to perform the state-based sensing procedure, and slots 605, 615, 625, 630 are slots for which the transmitting UE decides to not perform the state-based sensing procedure. The selection of slots by the transmitting UE may be represented via a bitmap. For example, the selection of slots, as shown in FIG. 6, may be represented via a bitmap expressed as 010100. In some aspects, a number of slots included in a sensing window may be based at least in part on a size of the sensing window.

In some aspects, there may be a plurality of RSRP thresholds (RSRP_T1, RSRP_T2, . . . , RSRP_TY) and based at least in part on determining the state (S), the transmitting UE may select a given RSRP threshold, against which RSRP measurements are compared to determine RSRP resources (e.g., resources unavailable for utilization by the transmitting UE), for performing the state-based sensing procedure.

Figure 7:
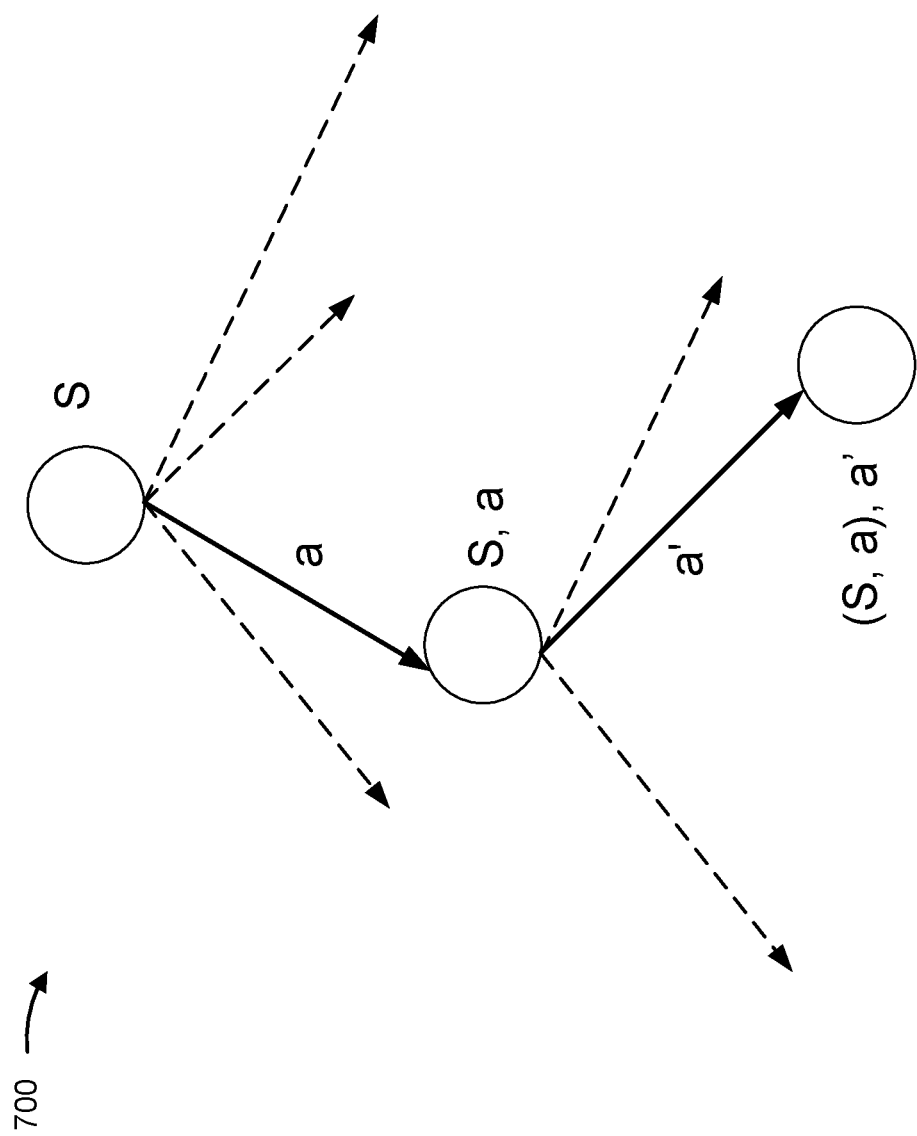
FIG. 7 is a diagram illustrating an example associated with a state-based sensing procedure, in accordance with various aspects of the present disclosure.

In some aspects, the transmitting UE may utilize a process (e.g., a Markov decision process) to determine a state (S) and/or to optimize a determined state. In some aspects, the transmitting UE may utilize the process to select the sensing window size, the number of slots, and the RSRP threshold and/or optimize selection of the sensing window size, the number of slots, and the RSRP threshold. As shown in FIG. 7, the transmitting UE may determine an optimized state (S, a) by utilizing the process to analyze information associated with determining the state (S) (e.g., information associated with quantizing the one or more state parameters) and chosen actions (a) (e.g., information associated with a first selection of the sensing window size, the number of slots, and the RSRP threshold). Similarly, as shown in FIG. 7, the transmitting UE may determine another optimized state (S') (e.g., (S, a), a') based at least in part on information associated with determining the state (S, a) and chosen actions (a') (e.g., information associated with a second selection of the sensing window size, the number of slots, and the RSRP threshold). Based at least in part on determining the optimized state (S'), the transmitting UE may optimize future selection of the sensing window size, the number of slots, and the RSRP threshold to perform the state-based sensing procedure.

In some aspects, a reinforcement learning algorithm may be used to process the information associated with the determined state (S) and/or the determined optimized state (S') to optimize future selection of the sensing window size, the number of slots, and the RSRP threshold. In some aspects, the reinforcement learning algorithm may include a Q-learning algorithm, a value iteration algorithm, and/or another dynamic or reinforcement learning scheme.

In some aspects, the transmitting UE may transmit information associated with quantizing the one or more state parameters (e.g., quantized values of the one or more state parameters) to one or more UEs in the sidelink network. In some aspects, the transmitting UE may transmit information associated with the determined state and/or the determined optimized states to the one or more UEs in the sidelink network. The one or more UEs may account for such information while performing respective state-based sensing procedures, thereby avoiding contentions, and improving communication in the sidelink network.

In some aspects, for the determined state (S), the transmitting UE may assign respective probabilities for selecting a sensing window size. For instance, for the determined state (S), the transmitting UE may assign probability $p_S = (p_S^1, p_S^2, p_S^3, \ldots, p_S^J)$ where $p_k^i$ is a probability of selecting a sensing window of size W_i. Similarly, for the determined state (S), the transmitting UE may assign probability $\beta_S = (\beta_S^1, \beta_S^2, \beta_S^3, \ldots, \beta_S^J)$ where $\beta_S^i$ is a probability of selecting a number (S_i) of sensing slots (or selecting a sub-slot set (S_i) including one or more slots). Further, for the determined state (S), the transmitting UE may assign probability $q_S = (q_S^1, q_S^2, q_S^3, \ldots, q_S^Y)$ where $q_S^i$ is a probability of selecting the RSRP threshold as RSRP_Ti. In some aspects, the transmitting UE may select a sensing window size, a number of slots, and an RSRP threshold to perform the state-based sensing procedure based at least in part on the assigned probabilities (e.g., $p_S$, $\beta_S$, $q_S$).

In some aspects, the transmitting UE may be provided with preconfigured values of the assigned probabilities (e.g., $p_S$, $\beta_S$, $q_S$). Alternatively, the transmitting UE may be provided with default values of the assigned probabilities (e.g., $p_S$, $\beta_S$, $q_S$). The transmitting UE may use the preconfigured values or the default values of the assigned probabilities (e.g., $p_S$, $\beta_S$, $q_S$) while performing the state-based sensing procedure.

In some aspects, the transmitting UE may initially use a set of random probabilities (e.g., $p_S$, $\beta_S$, $q_S$) and may update the random probabilities based at least in part on feedback received from another UE in the sidelink network. For instance, when the transmitting UE transmits the sidelink communication using the set of random probabilities, if the transmitting UE receives an ACK message from a receiving UE, the transmitting UE may increase values associated with the random probabilities. Similarly, when the transmitting UE transmits the sidelink communication using the set of random probabilities, if the transmitting UE receives a NACK message from the receiving UE, the transmitting UE may decrease values associated with the random probabilities.

When the transmitting UE uses the set of random probabilities to select a resource to transmit the sidelink communication, and the transmitting UE receives feedback from another UE that no contention was observed, indicating that the selected resource was a candidate resource available for utilization by the transmitting UE, the transmitting UE may increase values associated with the random probabilities. Similarly, when the transmitting UE uses the set of random probabilities to select a resource to transmit the sidelink communication and receives feedback from another UE that a contention was observed because the selected resource was either a reserved resource, reserved for utilization by the other the UE, or an RSRP resource impacted by reservation of the reserved resource, the transmitting UE may decrease values associated with the random probabilities. In this way, based at least in part on received feedback, the transmitting UE may use updated probabilities to reliably sense availability of the one or more sidelink resources.

By performing the state-based sensing procedure, as discussed herein, a transmitting UE may accurately and reliably sense availability of one or more sidelink resources for utilization by the transmitting UE to transmit a sidelink communication. The accurate and reliable sensing may enable the transmitting UE to avoid a contention. As a result, the transmitting UE may avoid retransmitting the sidelink communication, thereby enabling efficient utilization of network resources (e.g., bandwidth, subchannels, or the like) and internal UE resources (e.g., processing resources, use of memory space, or the like). Additionally, the transmitting UE may avoid consuming a threshold amount of while performing the state-based sensing procedure, thereby curtailing power consumption. In this way, operation of transmitting UEs may be optimized and data communication in the sidelink network may be improved.

Figure 8:
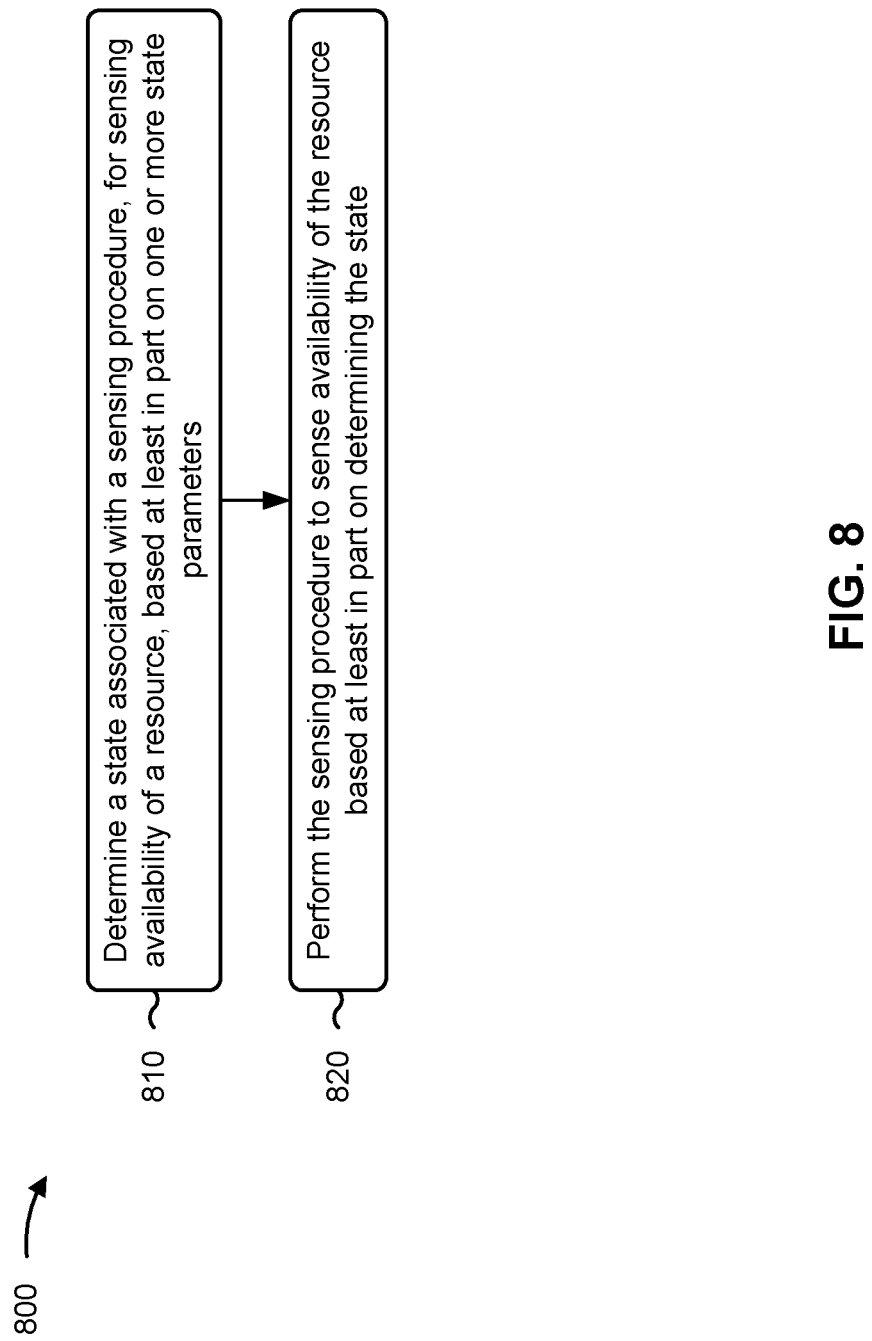
FIG. 8 is a diagram illustrating an example process associated with a state-based sensing procedure, in accordance with various aspects of the present disclosure.

FIG. 8 is a diagram illustrating an example process 800 performed, for example, by a UE (e.g., UE 120), in accordance with various aspects of the present disclosure. Example process 800 is an example where the UE performs operations associated with performing a state-based sensing procedure.

As shown in FIG. 8, in some aspects, process 800 may include determining a state associated with a sensing procedure, for sensing availability of a resource, based at least in part on one or more state parameters (block 810). For example, the UE (e.g., using determination component 908, depicted in FIG. 9) may determine a state associated with a sensing procedure, for sensing availability of a resource, based at least in part on one or more state parameters, as described above.

As further shown in FIG. 8, in some aspects, process 800 may include performing the sensing procedure to sense availability of the resource based at least in part on determining the state (block 820). For example, the UE (e.g., using determination component 908, depicted in FIG. 9) may perform the sensing procedure to sense availability of the resource based at least in part on determining the state, as described above.

Process 800 may include additional aspects, such as any single aspect or any combination of aspects described below and/or in connection with one or more other processes described elsewhere herein.

With respect to process 800, in a first aspect, the one or more state parameters include at least one of a channel busy ratio, a channel occupancy ratio, a modulation and coding scheme, a transport block size, a frequency allocation size, a frequency of transmission, or a priority associated with a transmission.

With respect to process 800, in a second aspect, alone or in combination with the first aspect, determining the state includes determining the state as a function of the one or more state parameters.

With respect to process 800, in a third aspect, alone or in combination with one or more of the first and second aspects, performing the sensing procedure includes selecting a sensing window size, a number of slots, and an RSRP threshold based at least part on determining the state.

With respect to process 800, in a fourth aspect, alone or in combination with one or more of the first through third aspects, performing the sensing procedure includes selecting a sensing window size, a number of slots, and an RSRP threshold based at least part on determining the state, the method further comprising determining, based at least in part on selecting the sensing window size, the number of slots, and the RSRP threshold, an optimized sensing window size, an optimized number of slots, and an optimized RSRP threshold to be utilized for performing the sensing procedure for the state.

With respect to process 800, in a fifth aspect, alone or in combination with one or more of the first through fourth aspects, process 800 includes quantizing one or more values associated with the one or more state parameters to provide one or more quantized values, and transmitting the one or more quantized values to another UE.

With respect to process 800, in a sixth aspect, alone or in combination with one or more of the first through fifth aspects, process 800 includes receiving one or more quantized values associated with the one or more state parameters from another UE, wherein performing the sensing procedure includes updating selection of a sensing window size, a number of slots, and an RSRP threshold based at least part on the one or more quantized values.

With respect to process 800, in a seventh aspect, alone or in combination with one or more of the first through sixth aspects, process 800 includes determining, for the state, respective probabilities for selecting a sensing window size, a number of slots, and an RSRP threshold, wherein performing the sensing procedure includes selecting the sensing window size, the number of slots, and the RSRP threshold based at least in part on the respective probabilities.

With respect to process 800, in an eighth aspect, such as in combination with the seventh aspect, values associated with the respective probabilities are preconfigured.

With respect to process 800, in a ninth aspect, such as in combination with the seventh aspect, process 800 includes determining the respective probabilities includes determining random values associated with the respective probabilities, and performing the sensing procedure includes updating the random values based at least in part on received feedback.

With respect to process 800, in a tenth aspect, alone or in combination with one or more of the first through ninth aspects, the respective probabilities are based at least in part on a reinforcement learning technique.

With respect to process 800, in an eleventh aspect, alone or in combination with one or more of the first through tenth aspects, process 800 includes determining the state based at least in part on a Markov decision process.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
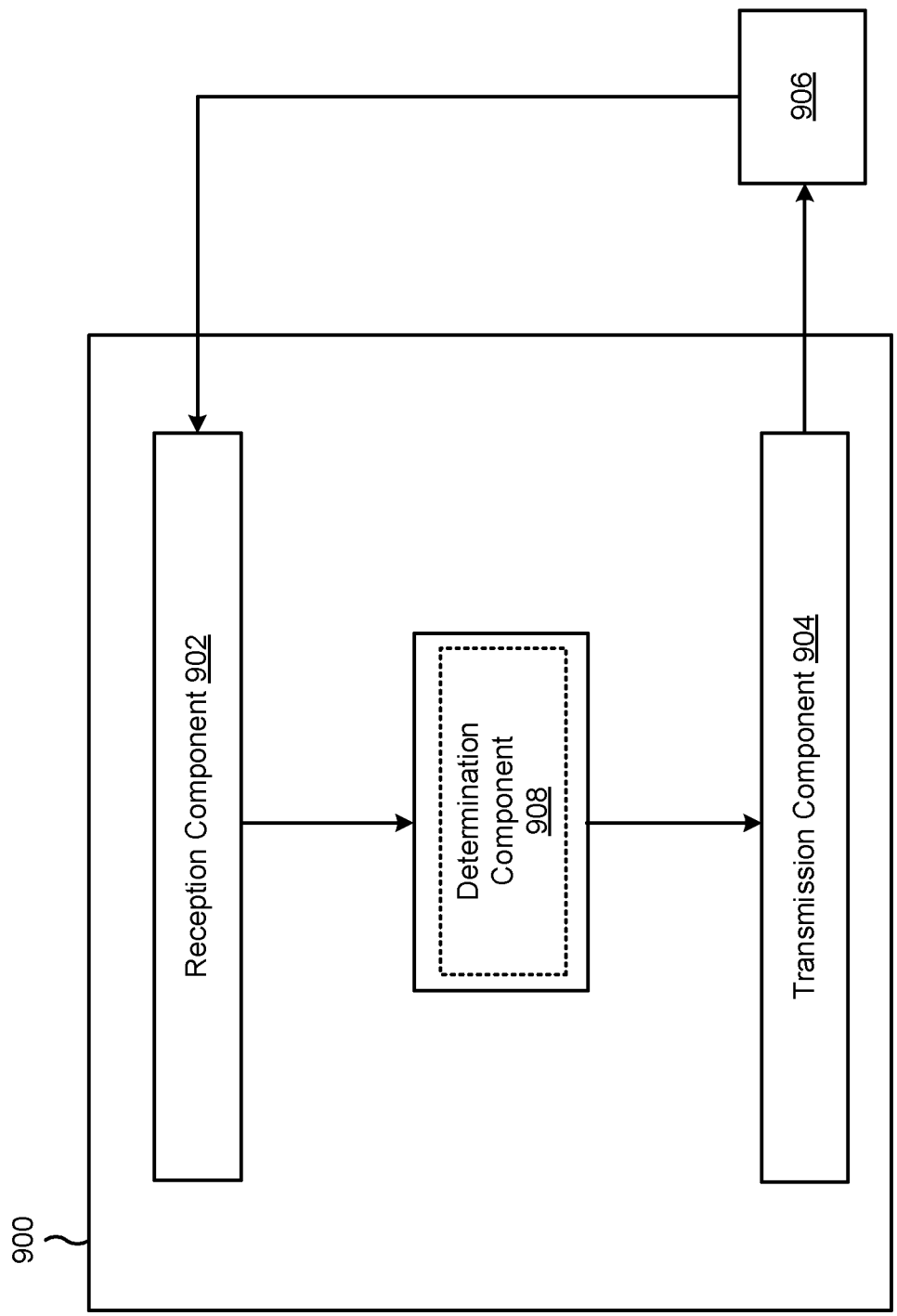
FIG. 9 is a diagram illustrating an example apparatus associated with a state-based sensing procedure, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908, among other examples.

In some aspects, the apparatus 900 may be configured to perform one or more operations described herein in connection with FIGS. 3-7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The determination component 908 may determine a state associated with a sensing procedure, for sensing availability of a resource, based at least in part on one or more state parameters. The determination component 908 may perform the sensing procedure to sense availability of the resource based at least in part on determining the state.

The determination component 908 may quantize one or more values associated with the one or more state parameters to provide one or more quantized values.

The transmission component 904 may transmit the one or more quantized values to another UE.

The reception component 902 may receive one or more quantized values associated with the one or more state parameters from another UE, wherein.

The determination component 908 may perform the sensing procedure includes updating selection of a sensing window size, a number of slots, and an RSRP threshold based at least part on the one or more quantized values.

The determination component 908 may determine, for the state, respective probabilities for selecting a sensing window size, a number of slots, and an RSRP threshold, wherein performing the sensing procedure includes selecting the sensing window size, the number of slots, and the RSRP threshold based at least in part on the respective probabilities.

The determination component 908 may determine the respective probabilities includes determining random values associated with the respective probabilities.

The determination component 908 may perform the sensing procedure includes updating the random values based at least in part on received feedback.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise forms disclosed. Modifications and variations may be made in light of the above disclosure or may be acquired from practice of the aspects.

Implementation examples are described in the following numbered aspects:

Aspect 1: A method of wireless communication performed by a user equipment (UE), comprising determining a state associated with a sensing procedure, for sensing availability of a resource, based at least in part on one or more state parameters; and performing the sensing procedure to sense availability of the resource based at least in part on determining the state.

Aspect 2: The method of Aspect 1, wherein the one or more state parameters include at least one of a channel busy ratio, a channel occupancy ratio, a modulation and coding scheme, a transport block size, a frequency allocation size, a frequency of transmission, or a priority associated with a transmission.

Aspect 3: The method of any of Aspects 1 and 2, wherein determining the state includes determining the state as a function of the one or more state parameters.

Aspect 4: The method of any of Aspects 1-3, wherein performing the sensing procedure includes selecting a sensing window size, a number of slots, and an RSRP threshold based at least part on determining the state.

Aspect 5: The method of any of Aspects 1-4, wherein performing the sensing procedure includes selecting a sensing window size, a number of slots, and an RSRP threshold based at least part on determining the state, the method further comprising determining, based at least in part on selecting the sensing window size, the number of slots, and the RSRP threshold, an optimized sensing window size, an optimized number of slots, and an optimized RSRP threshold to be utilized for performing the sensing procedure for the state.

Aspect 6: The method of any of Aspects 1-5, further comprising quantizing one or more values associated with the one or more state parameters to provide one or more quantized values; and transmitting the one or more quantized values to another UE.

Aspect 7: The method of any of Aspects 1-6, further comprising receiving one or more quantized values associated with the one or more state parameters from another UE, wherein performing the sensing procedure includes updating selection of a sensing window size, a number of slots, and an RSRP threshold based at least part on the one or more quantized values.

Aspect 8: The method of any of Aspects 1-7, further comprising determining, for the state, respective probabilities for selecting a sensing window size, a number of slots, and an RSRP threshold, wherein performing the sensing procedure includes selecting the sensing window size, the number of slots, and the RSRP threshold based at least in part on the respective probabilities.

Aspect 9: The method of Aspect 8, wherein values associated with the respective probabilities are preconfigured.

Aspect 10: The method of Aspect 8, wherein determining the respective probabilities includes determining random values associated with the respective probabilities, and performing the sensing procedure includes updating the random values based at least in part on received feedback.

Aspect 11: The method of any of Aspects 1-10, wherein determining the state includes determining the state based at least in part on a Markov decision process.

Aspect 12: The method of any of Aspects 1-11, wherein the respective probabilities are based at least in part on a reinforcement learning technique.

Aspect 13: An apparatus of a UE for wireless communication, comprising a memory and one or more processors coupled to the memory, the memory and the one or more processors configured to perform a method of any of Aspects 1-12.

Aspect 14: An apparatus for wireless communication, comprising at least one means for performing a method of any of Aspects 1-12.

Aspect 15: A non-transitory computer-readable medium storing one or more instructions for wireless communication, the one or more instructions comprising one or more instructions that, when executed by one or more processors of a UE, cause the one or more processors to perform a method of any of aspects 1-12.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   determine one or more quantized values of one or more state parameters associated with a sensing procedure for sensing availability of a resource;
   transmit the one or more quantized values to another UE;
   determine a state associated with the sensing procedure based at least in part on the one or more quantized values of the one or more state parameters; and
   perform the sensing procedure to sense availability of the resource based at least in part on determining the state.

2. The apparatus of claim 1, wherein the one or more state parameters include at least one of a channel busy ratio, a channel occupancy ratio, a modulation and coding scheme, a transport block size, a frequency allocation size, a frequency of transmission, or a priority associated with a transmission.

3. The apparatus of claim 1, wherein the one or more processors, when determining the state, are configured to determine the state as a function of the one or more state parameters.

4. The apparatus of claim 1, wherein the one or more processors, when performing the sensing procedure, are configured to select a sensing window size, a number of slots, and a measurement parameter threshold based at least part on determining the state.

5. The apparatus of claim 1, wherein the one or more processors are further configured to:
 select a sensing window size, a number of slots, and a measurement parameter threshold based at least part on determining the state, and
 determine, based at least in part on the selected sensing window size, the number of slots, and the measurement parameter threshold, an optimized sensing window size, an optimized number of slots, and an optimized measurement parameter threshold to be utilized for performing the sensing procedure for the state.

6. The apparatus of claim 1, wherein the one or more processors are further configured to:
 receive the one or more quantized values from another UE, wherein determining the one or more quantized values is based at least in part on receiving the one or more quantized values; and
 select a sensing window size, a number of slots, and a measurement parameter threshold based at least part on the one or more quantized values.

7. The apparatus of claim 1, wherein the one or more processors are further configured to:
 determine, for the state, respective probabilities for selecting a sensing window size, a number of slots, and a measurement parameter threshold, and
 select the sensing window size, the number of slots, and the measurement parameter threshold based at least in part on the respective probabilities.

8. The apparatus of claim 7, wherein values associated with the respective probabilities are preconfigured.

9. The apparatus of claim 7, wherein the one or more processors are further configured to:
 determine random values associated with the respective probabilities, and
 update the random values based at least in part on received feedback.

10. The apparatus of claim 7, wherein the respective probabilities are based at least in part on a reinforcement learning technique.

11. The apparatus of claim 1, wherein determining the state is based at least in part on a Markov decision process.

12. A method of wireless communication performed by a user equipment (UE), comprising:
 determining one or more quantized values of one or more state parameters associated with a sensing procedure for sensing availability of a resource;
 transmitting the one or more quantized values to another UE;
 determining a state associated with the sensing procedure based at least in part on the one or more quantized values of the one or more state parameters; and
 performing the sensing procedure to sense availability of the resource based at least in part on determining the state.

13. The method of claim 12, wherein the one or more state parameters include at least one of a channel busy ratio, a channel occupancy ratio, a modulation and coding scheme, a transport block size, a frequency allocation size, a frequency of transmission, or a priority associated with a transmission.

14. The method of claim 12, wherein determining the state includes determining the state as a function of the one or more state parameters.

15. The method of claim 12, wherein performing the sensing procedure includes selecting a sensing window size, a number of slots, and a measurement parameter threshold based at least part on determining the state.

16. The method of claim 12, wherein performing the sensing procedure includes selecting a sensing window size, a number of slots, and a measurement parameter threshold based at least part on determining the state, the method further comprising:
 determining, based at least in part on selecting the sensing window size, the number of slots, and the measurement parameter threshold, an optimized sensing window size, an optimized number of slots, and an optimized measurement parameter threshold to be utilized for performing the sensing procedure for the state.

17. The method of claim 12, further comprising:
 receiving the one or more quantized values associated with the one or more state parameters from another UE, wherein determining the one or more quantized values is based at least in part on receiving the one or more quantized values, wherein
 performing the sensing procedure includes selecting a sensing window size, a number of slots, and a measurement parameter threshold based at least part on the one or more quantized values.

18. The method of claim 12, further comprising:
 determining, for the state, respective probabilities for selecting a sensing window size, a number of slots, and a measurement parameter threshold, wherein performing the sensing procedure includes selecting the sensing window size, the number of slots, and the measurement parameter threshold based at least in part on the respective probabilities.

19. The method of claim 18, wherein values associated with the respective probabilities are preconfigured.

20. The method of claim 18, wherein
 determining the respective probabilities includes determining random values associated with the respective probabilities, and
 performing the sensing procedure includes updating the random values based at least in part on received feedback.

21. The method of claim 18, wherein the respective probabilities are based at least in part on a reinforcement learning technique.

22. The method of claim 12, wherein determining the state is based at least in part on a Markov decision process.

23. A non-transitory computer-readable medium storing a set of instructions for wireless communication, the set of instructions comprising:
 one or more instructions that, when executed by one or more processors of a user equipment (UE), cause the UE to:
  determine one or more quantized values of one or more state parameters associated with a sensing procedure for sensing availability of a resource;
  transmit the one or more quantized values to another UE;
  determine a state associated with the sensing procedure based at least in part on the one or more quantized values of the one or more state parameters; and
  perform the sensing procedure to sense availability of the resource based at least in part on determining the state.

24. The non-transitory computer-readable medium of claim 23, wherein the one or more state parameters include at least one of a channel busy ratio, a channel occupancy ratio, a modulation and coding scheme, a transport block size, a frequency allocation size, a frequency of transmission, or a priority associated with a transmission.

25. The non-transitory computer-readable medium of claim 23, wherein the one or more instructions, that cause the UE to perform the sensing procedure, cause the UE to select a sensing window size, a number of slots, and a measurement parameter threshold based at least part on determining the state.

26. An apparatus for wireless communication, comprising:
means for determining one or more quantized values of one or more state parameters associated with a sensing procedure for sensing availability of a resource;
means for transmitting the one or more quantized values to another UE;
means for determining a state associated with the sensing procedure based at least in part on the one or more quantized values of the one or more state parameters; and
means for performing the sensing procedure to sense availability of the resource based at least in part on determining the state.

27. The apparatus of claim 26, wherein the one or more state parameters include at least one of a channel busy ratio, a channel occupancy ratio, a modulation and coding scheme, a transport block size, a frequency allocation size, a frequency of transmission, or a priority associated with a transmission.

28. The apparatus of claim 26, wherein the means for performing the sensing procedure includes means for selecting a sensing window size, a number of slots, and a measurement parameter threshold based at least part on determining the state.

* * * * *